W. N. SEIBERT.
HAT PIN.
APPLICATION FILED MAR. 10, 1909.
962,987.
Patented June 28, 1910.
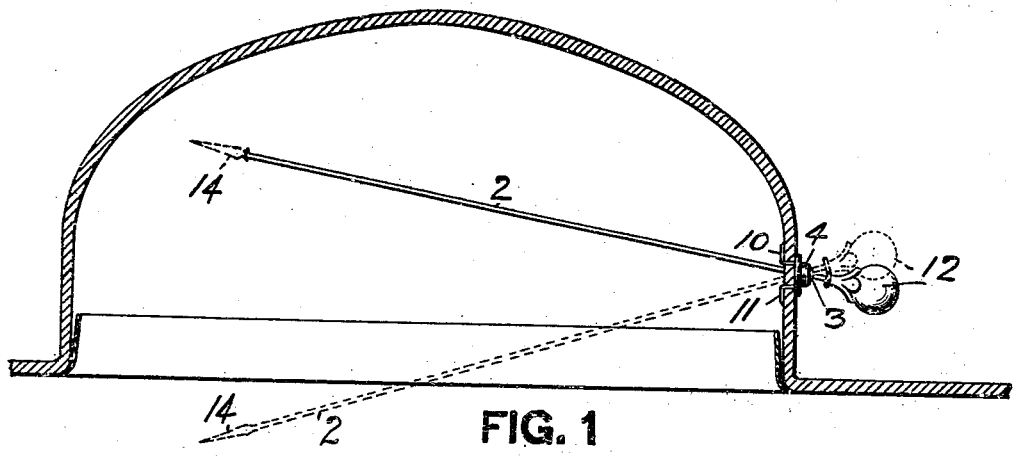
FIG. 1
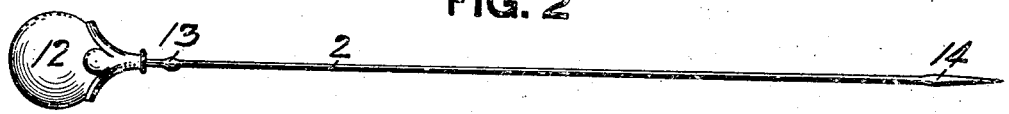
FIG. 2
FIG. 6
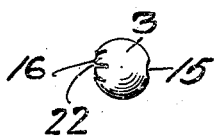
FIG. 3    FIG. 4
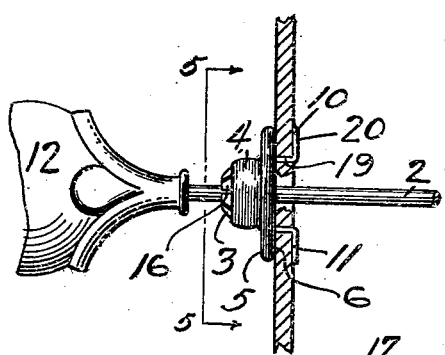
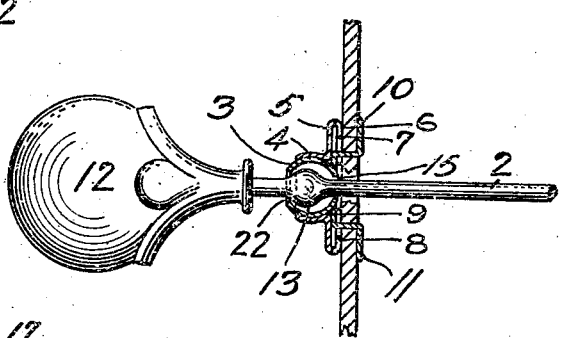
FIG. 7    FIG. 5
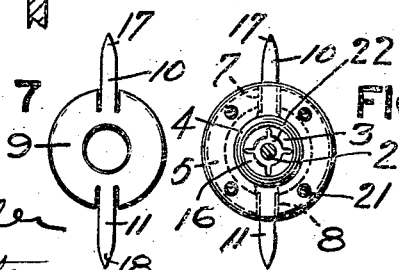
WITNESSES.
J. R. Keller
Robert C. Totten
INVENTOR.
William N Seibert
By Kay & Totten
Attorneys.

UNITED STATES PATENT OFFICE.

WILLIAM N. SEIBERT, OF PITTSBURG, PENNSYLVANIA.

HAT-PIN.

962,987.

Specification of Letters Patent.

Patented June 28, 1910.

Application filed March 10, 1909. Serial No. 482,582.

*To all whom it may concern:*

Be it known that I, WILLIAM N. SEIBERT, a resident of Pittsburg, in the county of Allegheny and State of Pennsylvania, have invented a new and useful Improvement in Hat-Pins; and I do hereby declare the following to be a full, clear, and exact description thereof.

My invention relates to hat fasteners. Its object is to provide a hat fastener of general pin form which may be driven through the hair of the wearer at any desired angle and which is capable at the same time of locking so as to prevent both slipping from its adjusted position and total withdrawal from the hat.

My invention consists, generally stated, in a hat fastener comprising a pin member and a hat gripping member provided with a ball and socket connection between them.

It also comprises an enlargement in the pin member adapted to seat securely within the ball and socket joint, and an enlarged end which prevents total withdrawal of the pin member through the joint.

It also consists in certain other improvements hereinafter set forth and claimed.

In the drawings Figure 1 is a section of a hat showing two positions of the hat fastener in place; Fig. 2 is a side view of the pin member; Fig. 3 is a detail view showing the ball and socket connection and the hat gripping device; Fig. 4 is a similar view in section; Fig. 5 is an end detail view taken as a section on the line 5—5, Fig. 3; Fig. 6 is a detail showing the socket; and Fig. 7 is another detail of the hat gripping member.

The hat shown is of a simple type but it is to be understood that the hat may be of any shape or style. My invention is so constructed that the fastener may be adjusted to grip any hat in a convenient manner at almost any position.

The pin member 2 slides through the ball 3 which is carried by the socket 4. The socket 4 is conveniently constructed of plate metal which may be bent to form the overlapping flanges 5 and 6, as shown clearly in Fig. 4. These flange portions are shown as having the apertures 7 and 8, and as inclosing the annular piece of plate metal 9 which is provided with the fingers 10 and 11 extending through the apertures 7 and 8, as clearly shown in Figs. 4, 5 and 7. The socket 4 is comparatively short, so as to allow oscillation through a large angle of the pin member 2 within the ball 3. This permits of the pin member being adjusted at any reasonable angle, as indicated in dotted lines, Fig. 1. The pin member may be provided with any desired type of ornamental head 12 arranged to screw onto the pin member 2, or be otherwise mounted thereon. Near this head, as shown, the pin member has the enlarged portion 13 of substantially spherical form. At its point the pin member is flattened so as to provide a javelin point or end 14, which is slightly larger in its greatest diameter than the inward aperture 15 in the ball. This enlarged end prevents the total withdrawal of the pin member from the ball, and hence from the fastening member, and at the same time tends to aid the enlarged portion 13 to hold the pin member in its adjusted position within the hair. The hollow ball 3 is constructed with the spring lips 16 surrounding the periphery of its outer aperture 22, as shown clearly in Figs. 3 and 6. These elastic lips permit of the admission of the enlargement 13 of the pin member, but prevent its accidental displacement from jolting or pressure from the hat caused by wind or other reasons. The pin member 2 may be adjusted so as to pierce the opposite wall of the hat, as shown in Fig. 1, but my invention enables the pin member to be adjusted to any position so as to pierce a rat or any portion of the hair, if desired, in which case the enlargement 13, fitting within the ball 3, will prevent its slipping out of place.

The fingers 10 and 11 are preferably two in number, as shown, but one or any greater number may be employed, as found convenient. They are to be constructed preferably of thin flexible metal with the pointed ends 17 and 18 by which the wall of the hat is easily pierced. When adjusting the hat fastener to position the flexible fingers are forced through the hat and then bent over along the interior of the hat, having the bent portions 19 and 20 extending preferably flush with the inner wall of the hat. By this means the hat gripping member is secured in one position to the hat so that the material of the hat is not mutilated by frequent piercing thereof in different places. The hat gripping member may also be provided with the holes 21 which are adapted to admit stitches for the purpose of sewing the member to the hat.

If desired, the fingers 10 and 11 may be dispensed with and the gripping member merely sewed to the hat, as indicated, in a fixed position, which is also within the spirit of my invention.

My invention is easy of construction, as the parts can be readily cut out by dies and easily set up, the enlarged point being preferably pressed or stamped after the ball and socket joint is adjusted, and the ornamental head desired being attached at the last.

My invention is simple and convenient in use. It obviates the necessity of frequent piercing of the hat, which is often very expensive, and at the same time provides a hat fastener which may be adjusted to any desired position in the hair.

This hat fastener need not necessarily be fixed so as to pierce the opposite wall of the hat, as it will remain, when locked, in the position desired, as indicated in dotted lines, Fig. 1. The enlarged end prevents total withdrawal, and also complete falling out of the pin member if for any reason the locking device has been loosened. By this means the loss of jewels or other valuable mountings is prevented without requiring a complicated device which is hard to adjust.

What I claim is:

1. A hat fastener comprising a pin member, and a hat gripping member, said members being provided with a ball and socket connection between them.

2. A hat fastener comprising a pin member, in combination with a hat gripping member provided with a socket and a perforated ball therein, through which the pin member is slidable.

3. A hat fastener comprising a hat gripping member having pointed fingers adapted to perforate the hat and joined to a socket having two oppositely disposed apertures, and a ball within said socket having a hole therethrough, in combination with a pin member slidable through said ball.

4. A hat fastener comprising a hat gripping member having pointed fingers adapted to perforate the hat, and a socket having two oppositely disposed apertures, and a hollow ball within said socket provided with oppositely disposed perforations, and with spring lips at one of said perforations, in combination with a pin member slidable through said perforations and provided with a locking enlargement adapted to be engaged by said spring lips.

5. A hat fastener comprising a hat gripping member provided with a hollow ball having perforations and with a socket surrounding said ball, in combination with a pin member slidable through said perforations.

In testimony whereof, I the said WILLIAM N. SEIBERT have hereunto set my hand.

WILLIAM N. SEIBERT.

Witnesses:
ROBERT C. TOTTEN,
J. R. KELLER.